United States Patent
Dinh et al.

(10) Patent No.: US 11,201,801 B2
(45) Date of Patent: Dec. 14, 2021

(54) MACHINE LEARNING-BASED DETERMINATIONS OF LIFESPAN INFORMATION FOR DEVICES IN AN INTERNET OF THINGS ENVIRONMENT

(71) Applicant: Dell Products L.P., Round Rock, TX (US)

(72) Inventors: Hung T. Dinh, Austin, TX (US); Bijan K. Mohanty, Austin, TX (US); Vinod V. Nair, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/662,577

(22) Filed: Oct. 24, 2019

(65) Prior Publication Data
US 2021/0126845 A1    Apr. 29, 2021

(51) Int. Cl.
*H04L 12/26* (2006.01)
*G06F 17/18* (2006.01)
*G06N 20/00* (2019.01)

(52) U.S. Cl.
CPC .......... *H04L 43/065* (2013.01); *G06F 17/18* (2013.01); *G06N 20/00* (2019.01); *H04L 43/04* (2013.01)

(58) Field of Classification Search
CPC ....... H04L 43/065; H04L 43/04; G06N 20/00; G06F 17/18
USPC ...................................................... 709/224
See application file for complete search history.

(56) References Cited

U.S. PATENT DOCUMENTS

| | | |
|---|---|---|
| 10,291,477 B1 | 5/2019 | Askar |
| 10,352,759 B1 | 7/2019 | Jensen |
| 2009/0284376 A1 | 11/2009 | Byun et al. |
| 2015/0372954 A1* | 12/2015 | Dubman ............... H04L 43/026 709/206 |
| 2016/0371316 A1 | 12/2016 | Okanohara et al. |
| 2017/0063826 A1 | 3/2017 | Sundaresan et al. |
| 2018/0060153 A1 | 3/2018 | Innes et al. |
| 2018/0268621 A1 | 9/2018 | Oz et al. |
| 2019/0028349 A1 | 1/2019 | Chen et al. |

(Continued)

FOREIGN PATENT DOCUMENTS

CN        107147613 A        9/2017

OTHER PUBLICATIONS

Andrew T. Conference Room IoT Projectors, Jul. 11, 2018, https://www.hackster.io/user883426442/conference-room-iot-projectors-e34cfe.

(Continued)

*Primary Examiner* — David R Lazaro
*Assistant Examiner* — Zia Khurshid
(74) *Attorney, Agent, or Firm* — Ryan, Mason & Lewis, LLP

(57) ABSTRACT

Methods, apparatus, and processor-readable storage media for machine learning-based determinations of lifespan information for devices in an Internet of Things (IoT) environment are provided herein. An example computer-implemented method includes automatically obtaining device telemetry data from one or more IoT-enabled devices within an IoT network, automatically determining lifespan-related information pertaining to at least a portion of the one or more IoT-enabled devices by applying a machine learning model to the device telemetry data, and initiating at least one automated action in response to the determined lifespan-related information.

20 Claims, 6 Drawing Sheets

(56) References Cited

U.S. PATENT DOCUMENTS

| | | |
|---|---|---|
| 2019/0087794 A1 | 3/2019 | Cho |
| 2019/0089813 A1 | 3/2019 | Choi |
| 2019/0121350 A1* | 4/2019 | Cella ................. H04L 67/12 |
| 2019/0171187 A1 | 6/2019 | Cella |
| 2019/0340013 A1 | 11/2019 | Cella |
| 2019/0349254 A1* | 11/2019 | Nolan ............. H04L 67/1093 |
| 2020/0184556 A1 | 6/2020 | Cella |
| 2020/0192350 A1 | 6/2020 | Cella |
| 2021/0188290 A1 | 6/2021 | Jin et al. |

OTHER PUBLICATIONS

Arslan Ali, et al. IoT Based Smart Projectors, International Journal of Scientific & Engineering Research vol. 8, Issue 6, Jun. 2017, ISSN 2229-5518, https://www.ijser.org/researchpaper/IoT-Based-Smart-Projectors.pdf.

PRWeb, Ilumi Solutions and Optoma Demonstrate World's First Io Projector and Lighting Integration, Sep. 15, 2016, https://www.prweb.com/releases/2016/09/prweb13689064.htm.

* cited by examiner

FIG. 3 ⟋300

```
# imports
import numpy as np
import matplotlib.pyplot as plt
import pandas as pd
import os as os def load_data(path, header):
    marks_df = pd.read_csv(path, header=header)
    returns marks_df if __name__ == "__main__":
    # load the data from the file
    print(os.getcwd())
    data = load_data("data/projectorStatus.txt", None)

# X = feature values, all the columns except the last column
    X = data.iloc[:, :-1]

#y = target values, last column of the data frame
    y = data.iloc[:, -1]

# filter out the projector lamps that got failed
    failed = data.loc[y == 1]

# filter out the projector lamps that didn't get failed
    not_failed = data.loc[y == 0]

# plots
    plt.scatter(failed.iloc[:, 0], failed.iloc[:, 1], s=10, c='red', label='Failed')
    plt.scatter(not_failed.iloc[:, 0], not_failed.iloc[:, 1], s=10, c='green', label='Not
    plt.xlabel("Lamp Hours")
    plt.ylabel("Brightness")
    plt.legend()
    plt.show()
```

FIG. 4

```
def sigmoid(z) :
    # Activation function used to map any real value between 0 and 1
    return 1 / (1 + np.exp(-z))

def net_inputs(theta, x) :
    # Computes the weighted sum of inputs
    return np.dot(x, theta)

def probability(theta, x) :
    # Returns the probability after passing through sigmoid
    return sigmoid(net_input(theta, x))

def cost_function(theta, x, y) :
    # Computes the cost function for all the training samples
    m = x.shape[0]
    total_cost = -(1 / m) * np.sum(
        y * np.log(probability(theta, x)) + (1 - y) * np.log(
            1 - probability(theta, x)))
    return total_cost def gradient(theta, x, y) :
    # Computes the gradient of the cost function at the point theta
    m = x.shape[0]
    return (1 / m) * np.dot(x.T, sigmoid(net_input(theta, x)) - y)

def fit(x, y, theta) :
    opt_weights = opt.fmin_tnc(func=cost_function, x0=theta,
                fprime=gradient, args=(x, y.flatten()))
    return opt_weights[0]

def predict(x) :
    theta = parameters[:, np.newaxis]
    return probability(theta, x)

preparing the data for building the model x = np.c_[np.ones((X.shape[0], 1)), X]
    y = y[:, np.newaxis]
    theta = np.zeros((X.shape[1], 1))

# Logistic Regression using Gradient Decent
    #print(cost function(theta, X, y))
    parameters = fit(X, y, theta)
    model_accuracy = accuracy(X, y.flatten())
    print("The accuracy of the model is {}" .format(model_accuracy))
    print("The model parameters using Gradient descent")
    print("\n")
    print(parameters)
```

```
model = LogisticRegression ()
model.fit(X, np.ravel(y,order='C'))

#Prediction for a Projector with Lamp hour=655 and Brightness=3 (1=Going to Fail and 0=Not
prediction_result = model.predict([[1, 655, 3]])
print('Lamp failure prediction :',prediction_result)

parameters = model.coef_
predicted_classes = model.predict(X)
accuracy = accuracy_score(y.flatten(),predicted_classes)*100
print('The accuracy score (usingLogReg model) is {}'.format(accuracy))
```

FIG. 5

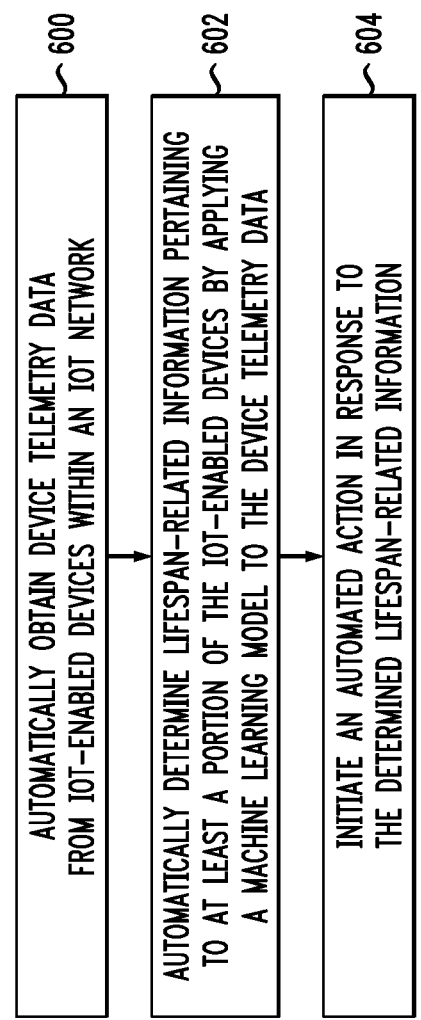

MACHINE LEARNING-BASED DETERMINATIONS OF LIFESPAN INFORMATION FOR DEVICES IN AN INTERNET OF THINGS ENVIRONMENT

FIELD

The field relates generally to information processing systems, and more particularly to techniques for providing information pertaining to devices in such systems.

BACKGROUND

In a multi-user enterprise environment, when a consumable part for a device reaches its end of life (EOL), that device is typically unusable until a user logs an incident to a ticketing or maintenance system to request a repair or a replacement. Additionally, it is difficult for a user to know or ascertain the current health status of a device (or a consumable part thereof) and proactively estimate its end of life. Accordingly, with conventional device management approaches, such outages and corresponding actionable remedies are commonly reactive, and negatively impact user experience as well as productivity.

SUMMARY

Illustrative embodiments of the disclosure provide techniques for machine learning-based determinations of lifespan information for devices in an Internet of Things (IoT) environment. An exemplary computer-implemented method includes automatically obtaining device telemetry data from one or more IoT-enabled devices within an IoT network, automatically determining lifespan-related information pertaining to at least a portion of the one or more IoT-enabled devices by applying a machine learning model to the device telemetry data, and initiating at least one automated action in response to the determined lifespan-related information.

Illustrative embodiments can provide significant advantages relative to conventional device management techniques. For example, challenges associated reactive, time-intensive actions are overcome in one or more embodiments through intelligent and automated determination of the status of a device or a consumable part thereof with respect to proximity to its EOL, and automatic interaction with a maintenance and/or ticketing system to facilitate one or more automated actions.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for logistics regression in an illustrative embodiment.

FIG. 4 shows example pseudocode for defining gradient descent and a cost function in an illustrative embodiment.

FIG. 5 shows example pseudocode for determining an EOL prediction using logistic regression model in an illustrative embodiment.

FIG. 6 is a flow diagram of a process for machine learning-based determinations of lifespan information for devices in an IoT environment in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
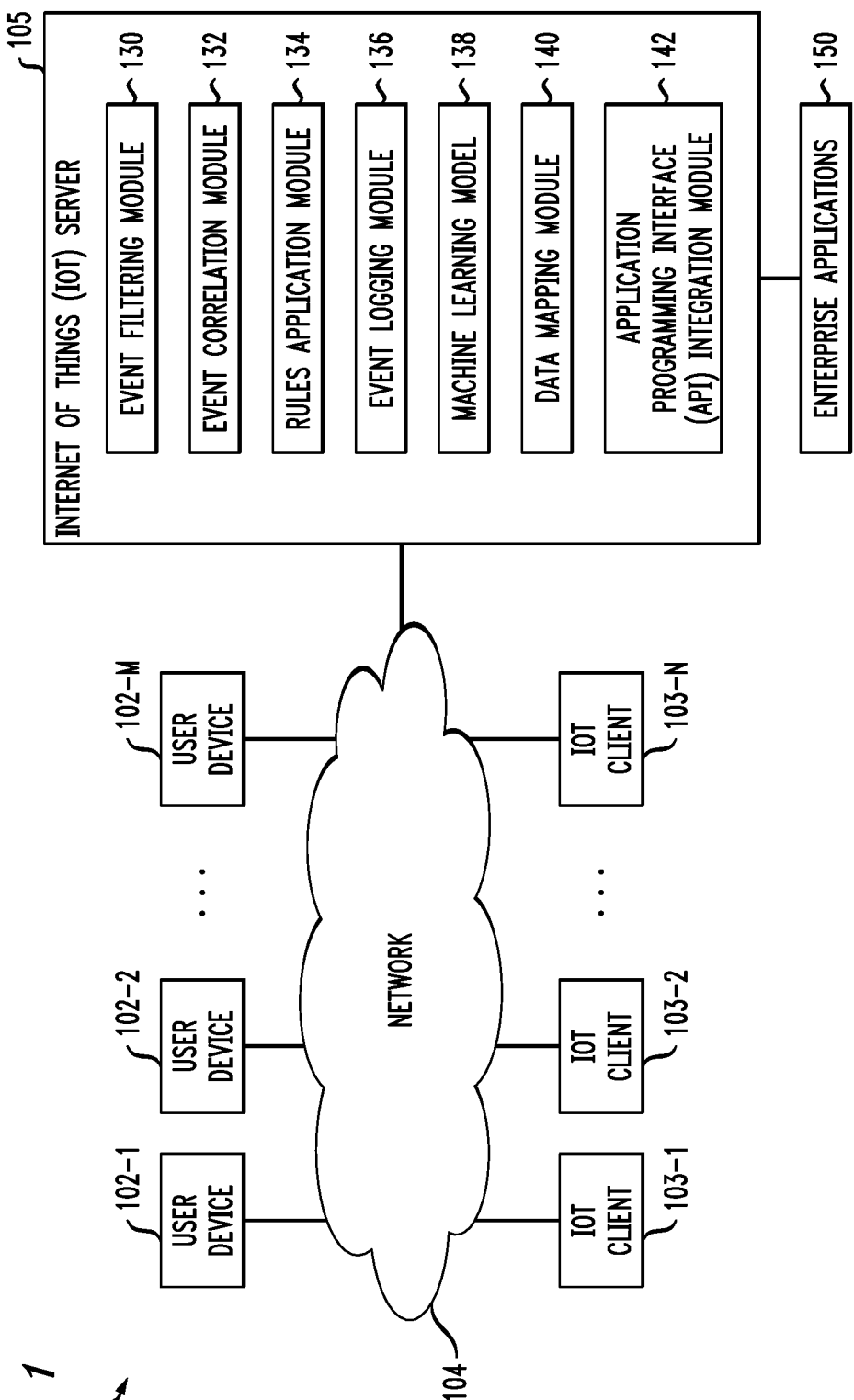
FIG. 1 shows an information processing system configured for machine learning-based determinations of lifespan information for devices in an IoT environment in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The computer network 100 also comprises a plurality of IoT clients 103-1, 103-2, ... 103-N, collectively referred to herein as IoT clients 103. The user devices 102 and IoT clients 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is IoT server 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." The IoT clients 103 may comprise, for example, laptop computers, desktop computers, projectors, or other types of devices having network connectivity. In at least one embodiment, user devices 102 can be used, for example, to check the status of one or more of the IoT clients 103.

The user devices 102 and IoT clients 103 in some embodiments comprise respective devices associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also depicted in FIG. 1, enterprise applications 150 are linked to and associated with the IoT server 105. Such enterprise applications 150 can include monitoring applications, maintenance applications, analytics applications, etc. related to one or more of the user devices 102 and/or IoT clients 103.

Additionally, the IoT server 105 can have an associated database configured to store data pertaining to user devices and IoT clients, which comprise, for example, lifecycle and maintenance information pertaining to various components of such devices and clients.

Such a database, in at least one embodiment, is implemented using one or more storage systems associated with the IoT server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the IoT server 105, in one or more embodiments, are input-output devices, which illustratively comprise keyboards, displays or other types of input-output devices in any combination. Such input-output devices can be used, for example, to support one or more user interfaces to the IoT server 105, as well as to support communication between the IoT server 105 and user devices 102, IoT clients 103, and/or other related systems and devices not explicitly shown.

Additionally, the IoT server 105 in the FIG. 1 embodiment is assumed to be implemented using at least one processing device. Each such processing device generally comprises at least one processor and an associated memory, and implements one or more functional modules for controlling certain features of the IoT server 105.

More particularly, the IoT server 105 in such an embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

Such memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

Additionally, in at least one embodiment, a network interface allows the IoT server 105 to communicate over the network 104 with the user devices 102 and IoT clients 103, and illustratively comprises one or more conventional transceivers.

The IoT server 105 further comprises an event filtering module 130, an event correlation module 132, a rules application module 134, an event logging module 136, a machine learning model 138, a data mapping module 140, and an application programming interface (API) integration module 142.

It is to be appreciated that this particular arrangement of modules 130, 132, 134, 136, 138, 140 and 142 illustrated in the IoT server 105 of the FIG. 1 embodiment is presented by way of example only, and alternative arrangements can be used in other embodiments. For example, the functionality associated with the modules 130, 132, 134, 136, 138, 140 and 142 in other embodiments can be combined into a single module, or separated across a larger number of modules on the IoT server 105 or on one or more of the user devices 102 and/or IoT clients 103. As another example, multiple distinct processors can be used to implement different ones of the modules 130, 132, 134, 136, 138, 140 and 142 or portions thereof. Also, at least portions of the modules 130, 132, 134, 136, 138, 140 and 142 may be implemented at least in part in the form of software that is stored in memory and executed by a processor.

It is to be understood that the particular set of elements shown in FIG. 1 involving user devices 102 and IoT clients 103 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 130, 132, 134, 136, 138, 140 and 142 of an example IoT server 105 in computer network 100 will be described in more detail with reference to the flow diagram of FIG. 6.

Figure 2:
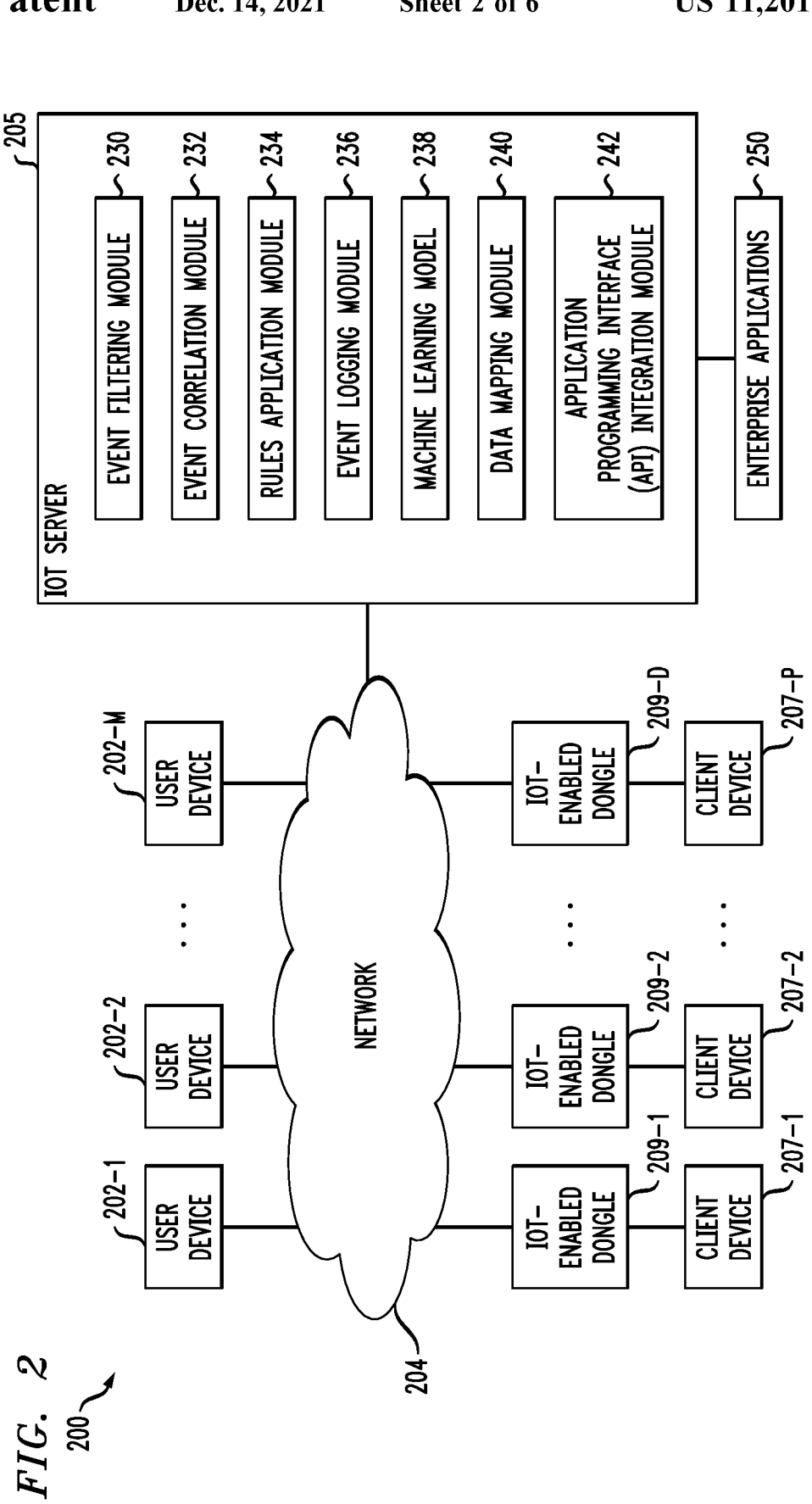
FIG. 2 shows an information processing system configured for machine learning-based determinations of lifespan information for devices in an IoT environment in an illustrative embodiment.

FIG. 2 shows an information processing system configured for machine learning-based determinations of lifespan information for devices in an IoT environment in an illustrative embodiment. The information processing system 200 depicted in FIG. 2 is analogous to the information processing system 100 depicted in FIG. 1, with similar implementations of user devices 202, network 204, enterprise applications 250, and an IoT server 205 (including modules 230, 232, 234, 236, 238, 240 and 242). As distinguished from FIG. 1, however, FIG. 2 depicts, instead of IoT clients 103, client devices 207-1, 207-2, . . . 207-P (collectively referred to herein as client devices 207), and IoT-enabled dongles 209-1, 209-2, . . . 209-D (collectively referred to herein as IoT-enabled dongles 209).

The IoT-enable dongles 209, also referred to herein as connectivity devices, provide network connectivity (e.g., via Wi-Fi capabilities) to the client devices 207 (which do not inherently possess network connectivity) and enables communication of health status information from the client devices 207 to the IoT server 205. More generally, as used herein, a dongle (connectivity device) represents a hardware device that connects to a separate device (such as a client device 207, for example) to provide the separate device with functionality not originally within the separate device's capabilities (such as, for example, network connectivity), and/or to enable a pass-through to the separate device that adds functionality not originally within the separate device's capabilities.

In one or more embodiments, IoT-enabled dongles 209 interface with client devices 207 using a RS232-C serial interface and/or a universal serial bus (USB) interface. The RS232-C serial interface can be utilized to interface (that is, to connect the IoT-enabled dongle 209) with client devices 207 such as projectors, for example. The USB interface can be utilized, for example, to interface (that is, connect the IoT-enabled dongle 209) to a client device 207 such as a computer, and configure network information (e.g., Wi-Fi networks) and static information such as location, client device name, etc. In one or more embodiments, once an IoT-enabled dongle 209 connects with a network (e.g., a Wi-Fi network) such as network 204, meta-data such as client device (207) details, location information, etc. are entered into the IoT-enabled dongle 209 and sent to one or more servers such as IoT server 205. Additionally, in at least one embodiment, the IoT-enabled dongle 209, once connected to network 204, can automatically update any new firmware, as necessary and/or available.

Also, in one or more embodiments, the IoT-enabled dongle 209 includes a central processing unit (which can include, for example, a Wi-Fi controller, an input/output (I/O) interface controller, a firmware executor, and a device translation engine), which executes the firmware and polls (i.e., communicates with) a corresponding client device 207 to obtain health information (pertaining to the client device 207) using the device translation engine. Additionally, in such an embodiment, the IoT-enabled dongle 209 then sends at least a portion of such obtained health information in one or more JSON message format to IoT server 205.

More specifically, in at least one example embodiment, the IoT-enabled dongle 209 periodically polls a client device 207 such as a projector using HEX code (in start-of-text (STX) command end-of-text (ETX) format) for serial interface data related to, for example, lamp life, brightness, errors, heat and power information. In such an embodiment, the projector provides American Standard Code for Information Interchange (ASCII) commands to the IoT-enabled dongle 209, which are converted (by the IoT-enabled dongle 209) into HEX code before being provided to the IoT server 205. In one or more embodiments, firmware of the IoT-enabled dongle 209 hosts at least one (updateable) translation table for ASCII command equivalents for various client device 207 (e.g., projector) models.

Additionally, in at least one embodiment, the IoT-enabled dongle 209 sends such obtained and/or converted client device 207 attribute metadata to IoT server 205 for use in training one or more machine learning models, carrying out one or more intelligent decisions, carrying out one or more proactive and/or predictive actions, and performing analytics related to the client devices 207. By way of example, API integration module 242 can be utilized to initiate an automated preemptive and/or remedial action with respect to one or more client devices 203, in response to an EOL prediction generated machine learning model 238. Further, in such an embodiment, the output of the IoT-enabled dongle 209 to the IoT server 205 can be in a variety of formats.

Accordingly, at least one embodiment of the invention includes providing an IoT infrastructure (with respect to both client devices and a server) with one or more machine learning plug-ins that can proactively predict the end of life of a client device and/or a consumable part thereof. Such an embodiment includes acquiring device telemetry data (from the client device) and applying at least one machine learning model to predict the end of life information and proactively take action to mitigate outage risks. Further, one or more embodiments can include operating on a predetermined schedule or operating on an ad hoc basis.

As also detailed herein, examples of the machine learning models utilized in accordance with one or more embodiments include one or more supervised learning models. By way of example, such an embodiment can include obtaining an input of independent variables (such as, for a projector client device, lamp hours, ambient temperature, brightness levels, etc.), applying a linear regression (summation) to the input to generate an initial output, and applying a sigmoid function (logistics) to this initial output to generate a binary classification output (that is, at risk for failing versus not at risk for failing). Accordingly, in such an embodiment, a self-tuning, trained algorithm is implemented that includes a binary logistic regression algorithm that uses a sigmoid function on the output of the linear regression (single variate or multi-variate regression) for classification.

By way merely of illustration, consider the use of hypothesis ($h_\theta(x)=\theta_0+\theta_1 x$) for single variable or hypothesis ($h_\theta(x)=\theta_0+\theta_1 x_1+\theta_2 x_2+\theta_3 x_3+\theta_4 x_4$) for multiple variable regression, wherein $x_1$, $x_2$, etc. are the independent attributes (such as, for example, lamp hours used, brightness level, and ambient temperature). As such, one or more embodiments can include striving for minimizing the cost function $$J(\theta_0, \theta_1) = \frac{1}{2m}\sum_{i=1}^{m}(h_\theta(x^{(i)}) - y^{(i)})^2$$

to calculate and predict EOL information pertaining to one or more of the independent variables (such as, for example, how much lamp life is left in the projector).

By way of further illustration, consider use of the following example equation of a linear regression: $h(x)=\theta^T x$. Additionally, at least one example embodiment can include using a sigmoid function $$\sigma(x) = \frac{1}{1+e^{-x}}$$

to calculate the probability (e.g., a value between 0 and 1) of failure of at least one of the independent variables (such as, for example, a lamp failure in the projector) and a binary output of YES (1) or NO (0) using a logistics regression model. Accordingly, in such an example embodiment, the hypothesis of the logistic regression becomes $$h(x) = \frac{1}{1+e^{-\theta^T x}}.$$

Further, one or more embodiments include collecting data from multiple devices (e.g., IoT clients 103 and/or client devices 203) within one or more enterprises (on at least one given cloud, for example) to train the machine learning models and improve predication accuracy.

As detailed below, FIG. 3, FIG. 4, and FIG. 5 depict example pseudocode related to one or more aspects of at least one embodiment. The noted pseudocode utilizes one or more machine learning libraries to implement a logistics regression model to train and test one or more device life cycle attributes, and also leverages a plotting library for generating a scatterplot from device attributes sample data.

FIG. 3 shows example pseudocode for logistics regression in an illustrative embodiment. In this embodiment, pseudocode 300 is executed by or under the control of a computing device, such as IoT server 105 or 205. For example, the pseudocode 300 may be viewed as comprising a portion of a software implementation of at least part of machine learning model 138/238 of the FIG. 1 and FIG. 2 embodiments.

The pseudocode 300 illustrates importing libraries and loading a projector data set (pd.read_csv(path, header=header)). Additionally, as detailed in the pseudocode 300, the values (X and Y axis) are read from the data set and a scatterplot (lamp hours as the X axis and brightness of lamp as the Y axis) is generated.

It is to be appreciated that this particular pseudocode shows just one example implementation of a process for logistics regression, and alternative implementations of the process can be used in other embodiments.

FIG. 4 shows example pseudocode for defining gradient descent and a cost function in an illustrative embodiment. In this embodiment, pseudocode 400 is executed by or under the control of a computing device, such as IoT server 105 or 205. For example, the pseudocode 400 may be viewed as comprising a portion of a software implementation of at least part of machine learning model 138/238 of the FIG. 1 and FIG. 2 embodiments.

The pseudocode 400 illustrates an example implementation of a logistics regression using statistical techniques such as gradient descent and a sigmoid function for binary classification. The cost function and probability predictions are implemented as separate functions that can be used later in one or more additional portions of code. Also, the pseudocode 400 illustrates building a logistics regression model using gradient descent and trained with sample data (passing X, y values) to a fit function. The model, in the example shown via the pseudocode 400, predicts projector data (with lamp hour 655 and brightness level 3), and the accuracy of the model is calculated and printed.

It is to be appreciated that this particular pseudocode shows just one example implementation of a process for defining gradient descent and a cost function, and alternative implementations of the process can be used in other embodiments.

FIG. 5 shows example pseudocode for determining an EOL prediction using logistic regression model in an illustrative embodiment. In this embodiment, pseudocode 500 is executed by or under the control of a computing device, such as IoT server 105 or 205. For example, the pseudocode 500 may be viewed as comprising a portion of a software implementation of at least part of machine learning model 138/238 of the FIG. 1 and FIG. 2 embodiments.

The pseudocode 500 illustrates using a library function to build a logistics regression model. Sample data are used to train the model and the accuracy of the model is calculated and printed, which can be compared to one or more alternate approaches of implementing a model using gradient descent.

It is to be appreciated that this particular pseudocode shows just one example implementation of a process for determining an EOL prediction using logistic regression model, and alternative implementations of the process can be used in other embodiments.

FIG. 6 is a flow diagram of a process for machine learning-based determinations of lifespan information for devices in an IoT environment in an illustrative embodiment. It is to be understood that this particular process is only an example, and additional or alternative processes can be carried out in other embodiments.

In this embodiment, the process includes steps 600 through 604. These steps are assumed to be performed by the IoT server 105 utilizing at least modules 138, 140 and 142.

Step 600 includes automatically obtaining device telemetry data from one or more IoT-enabled devices within an IoT network. The device telemetry data can include measurements quantifying one or more variables pertaining to operation of at least a portion of the one or more IoT-enabled devices.

Step 602 includes automatically determining lifespan-related information pertaining to at least a portion of the one or more IoT-enabled devices by applying a machine learning model to the device telemetry data. In at least one embodiment, applying the machine learning model includes implementing one or more linear regression techniques (such as, for example, one or more single variate regression techniques and/or one or more multi-variate regression techniques). Such an embodiment can also include applying one or more sigmoid functions to at least a portion of an output of the one or more linear regression techniques.

Step 604 includes initiating at least one automated action in response to the determined lifespan-related information. In one or more embodiments, initiating the at least one automated action includes automatically generating an incident report pertaining to the at least a portion of the one or more IoT-enabled devices, and automatically submitting the incident report to a ticketing system. Also, in at least one embodiment, the determined lifespan-related information includes a binary classification between (i) within a predetermined proximity of end of life and (ii) not within the predetermined proximity of end of life.

Additionally, the techniques depicted in FIG. 6 can also include generating the machine learning model based at least in part on device telemetry data collected from multiple devices analogous to the one or more IoT-enabled devices within the IoT network. Further, the techniques depicted in FIG. 6 can be performed in accordance with a predetermined schedule, or can be performed on an ad hoc basis.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide an intelligent IoT infrastructure with machine learning plugins to proactively predict end of life information associated with client devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
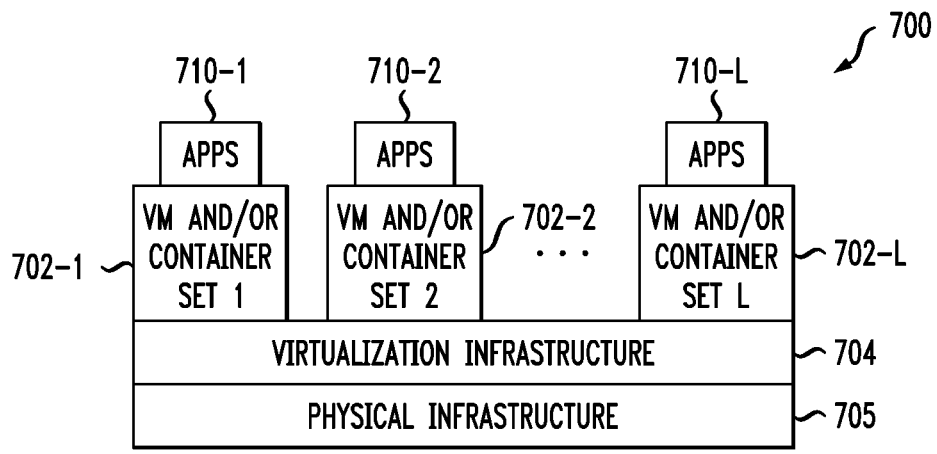
FIGS. 7 and 8 show examples of processing platforms that may be utilized to implement at least a portion of an information processing system in illustrative embodiments.
Figure 8:
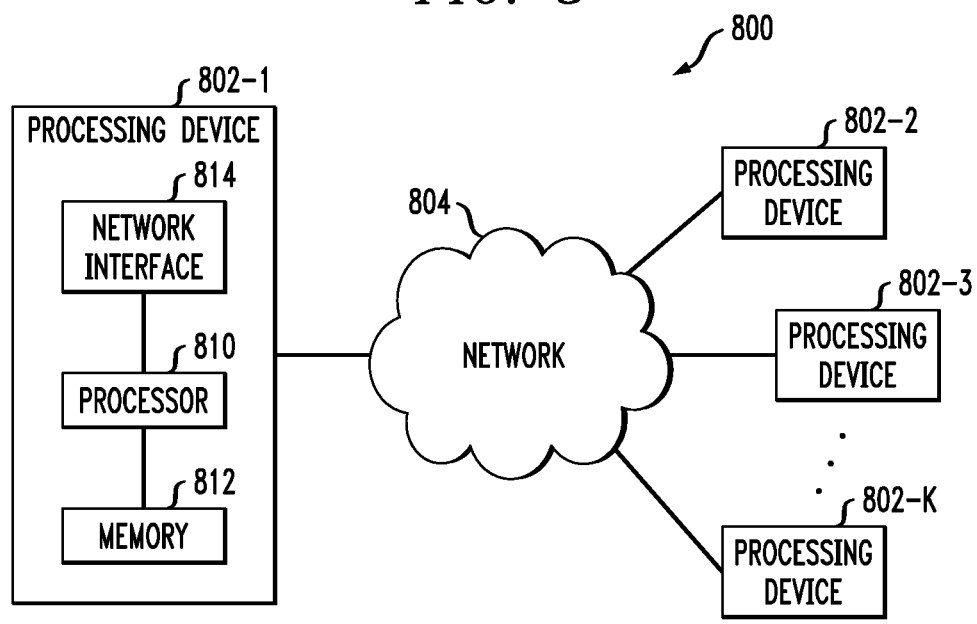

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, clients, and servers in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

automatically obtaining device telemetry data from one or more Internet of Things-enabled devices within an Internet of Things network, wherein the device telemetry data pertains to multiple independent attributes of the one or more Internet of Things-enabled devices;

automatically determining lifespan-related information pertaining to at least a portion of the one or more Internet of Things-enabled devices by applying a machine learning model to the device telemetry data, wherein the determined lifespan-related information comprises a binary classification between (i) within a predetermined proximity of end of life and (ii) not within the predetermined proximity of end of life, and wherein applying the machine learning model to the device telemetry data comprises:

minimizing a cost function of $$J(\theta_0, \theta_1) = \frac{1}{2m}\sum_{i=1}^{m}(h_\theta(x^{(i)}) - y^{(i)})^2$$

pertaining to calculating end of life information for at least one of the multiple independent attributes of the one or more Internet of Things-enabled devices, and generating, for at least one of the multiple independent attributes of the one or more Internet of Things-enabled devices, the binary classification by processing the device telemetry data pertaining to at least a portion of the multiple independent attributes of the one or more Internet of Things-enabled devices using at least one sigmoid function in conjunction with one or more linear regression techniques comprising $$h(x) = \frac{1}{1+e^{-\theta^T x}},$$

wherein x represents the at least one independent attribute, $h(x)=\theta^T$ x represents the one or more linear regression techniques, and $$\frac{1}{1+e^{-x}}$$

represents the at least one sigmoid function for calculating a value associated with the binary classification for the at least one independent attribute; and initiating at least one automated action in response to the determined lifespan-related information;

wherein the method is performed by at least one processing device comprising a processor coupled to a memory.

2. The computer-implemented method of claim 1, wherein the one or more linear regression techniques comprise one or more single variate regression techniques.

3. The computer-implemented method of claim 1, wherein the one or more linear regression techniques comprise one or more multi-variate regression techniques.

4. The computer-implemented method of claim 1, wherein initiating the at least one automated action comprises:
   automatically generating an incident report pertaining to the at least a portion of the one or more Internet of Things-enabled devices; and
   automatically submitting the incident report to a ticketing system.

5. The computer-implemented method of claim 1, wherein the device telemetry data comprise measurements quantifying one or more variables pertaining to operation of at least a portion of the one or more Internet of Things-enabled devices.

6. The computer-implemented method of claim 1, further comprising:
   generating the machine learning model based at least in part on device telemetry data collected from multiple devices analogous to the one or more Internet of Things-enabled devices within the Internet of Things network.

7. The computer-implemented method of claim 1, wherein the method is performed in accordance with a predetermined schedule.

8. The computer-implemented method of claim 1, wherein the method is performed on an ad hoc basis.

9. A non-transitory processor-readable storage medium having stored therein program code of one or more software programs, wherein the program code when executed by at least one processing device causes the at least one processing device:
   to automatically obtain device telemetry data from one or more Internet of Things-enabled devices within an Internet of Things network, wherein the device telemetry data pertains to multiple independent attributes of the one or more Internet of Things-enabled devices;
   to automatically determine lifespan-related information pertaining to at least a portion of the one or more Internet of Things-enabled devices by applying a machine learning model to the device telemetry data, wherein the determined lifespan-related information comprises a binary classification between (i) within a predetermined proximity of end of life and (ii) not within the predetermined proximity of end of life, and wherein applying the machine learning model to the device telemetry data comprises:
   minimizing a cost function of $$J(\theta_0, \theta_1) = \frac{1}{2m}\sum_{i=1}^{m}(h_\theta(x^{(i)}) - y^{(i)})^2$$

pertaining to calculating end of life information for at least one of the multiple independent attributes of the one or more Internet of Things-enabled devices, and generating, for at least one of the multiple independent attributes of the one or more Internet of Things-enabled devices, the binary classification by processing the device telemetry data pertaining to at least a portion of the multiple independent attributes of the one or more Internet of Things-enabled devices using at least one sigmoid function in conjunction with one or more linear regression techniques comprising $$h(x) = \frac{1}{1 + e^{-\theta^T x}},$$

wherein x represents the at least one independent attribute, $h(x) = \theta^T x$ represents the one or more linear regression techniques, and $$\frac{1}{1 + e^{-x}}$$

represents the at least one sigmoid function for calculating a value associated with the binary classification for the at least one independent attribute; and
   to initiate at least one automated action in response to the determined lifespan-related information.

10. The non-transitory processor-readable storage medium of claim 9, wherein the one or more linear regression techniques comprise one or more single variate regression techniques.

11. The non-transitory processor-readable storage medium of claim 9, wherein the one or more linear regression techniques comprise one or more multi-variate regression techniques.

12. The non-transitory processor-readable storage medium of claim 9, wherein initiating the at least one automated action comprises:
   automatically generating an incident report pertaining to the at least a portion of the one or more Internet of Things-enabled devices; and
   automatically submitting the incident report to a ticketing system.

13. The non-transitory processor-readable storage medium of claim 9, wherein the program code when executed by the at least one processing device causes the at least one processing device:
   to generate the machine learning model based at least in part on device telemetry data collected from multiple devices analogous to the one or more Internet of Things-enabled devices within the Internet of Things network.

14. The non-transitory processor-readable storage medium of claim 9, wherein the device telemetry data comprise measurements quantifying one or more variables pertaining to operation of at least a portion of the one or more Internet of Things-enabled devices.

15. An apparatus comprising:
   at least one processing device comprising a processor coupled to a memory;
   the at least one processing device being configured:
   to automatically obtain device telemetry data from one or more Internet of Things-enabled devices within an Internet of Things network, wherein the device telemetry data pertains to multiple independent attributes of the one or more Internet of Things-enabled devices;
   to automatically determine lifespan-related information pertaining to at least a portion of the one or more Internet of Things-enabled devices by applying a machine learning model to the device telemetry data, wherein the determined lifespan-related information comprises a binary classification between (i) within a predetermined proximity of end of life and (ii) not within the predetermined proximity of end of life, and wherein applying the machine learning model to the device telemetry data comprises:

minimizing a cost function of $$J(\theta_0, \theta_1) = \frac{1}{2m} \sum_{i=1}^{m} (h_\theta(x^{(i)}) - y^{(i)})^2$$

pertaining to calculating end of life information for at least one of the multiple independent attributes of the one or more Internet of Things-enabled devices, and generating, for at least one of the multiple independent attributes of the one or more Internet of Things-enabled devices, the binary classification by processing the device telemetry data pertaining to at least a portion of the multiple independent attributes of the one or more Internet of Things-enabled devices using at least one sigmoid function in conjunction with one or more linear regression techniques comprising $$h(x) = \frac{1}{1 + e^{-\theta^T x}},$$

wherein x represents the at least one independent attribute, $h(x) = \theta^T x$ represents the one or more linear regression techniques, and $$\frac{1}{1 + e^{-x}}$$

represents the at least one sigmoid function for calculating a value associated with the binary classification for the at least one independent attribute; and to initiate at least one automated action in response to the determined lifespan-related information.

16. The apparatus of claim 15, wherein the one or more linear regression techniques comprise one or more single variate regression techniques.

17. The apparatus of claim 15, wherein the device telemetry data comprise measurements quantifying one or more variables pertaining to operation of at least a portion of the one or more Internet of Things-enabled devices.

18. The apparatus of claim 15, wherein initiating the at least one automated action comprises:

automatically generating an incident report pertaining to the at least a portion of the one or more Internet of Things-enabled devices; and automatically submitting the incident report to a ticketing system.

19. The apparatus of claim 15, wherein the at least one processing device is further configured:

to generate the machine learning model based at least in part on device telemetry data collected from multiple devices analogous to the one or more Internet of Things-enabled devices within the Internet of Things network.

20. The apparatus of claim 15, wherein the one or more linear regression techniques comprise one or more multivariate regression techniques.

* * * * *